United States Patent [19]
Richards

[11] Patent Number: 5,014,127
[45] Date of Patent: May 7, 1991

[54] METHOD OF GENERATING A SERIES OF DPCM CODE WORDS, METHOD OF STORING COLOR IMAGE DATA, OPTICAL DISC WHEREON IMAGE DATA ARE STORED, AND DISPLAY APPARATUS

[75] Inventor: Norman D. Richards, Horsham, England

[73] Assignee: U.S. Philips Corporation, New York, N.Y.

[21] Appl. No.: 509,682

[22] Filed: Apr. 12, 1990

[30] Foreign Application Priority Data

Apr. 14, 1989 [GB] United Kingdom ................. 8908442

[51] Int. Cl.$^5$ .......................................... H04N 11/04
[52] U.S. Cl. .................................... 358/133; 358/13; 358/135; 358/310; 358/335
[58] Field of Search ................. 358/133, 135, 13, 310, 358/333

[56] References Cited

U.S. PATENT DOCUMENTS 4,665,436 5/1987 Osborne ............................ 358/135
4,785,349 11/1988 Keith ................................. 358/133

Primary Examiner—Howard W. Britton

[57] ABSTRACT

Image data (YUVAR) are received from an image source and separated into luminance (Y) and chrominance (U,V) values. These are DPCM coded (LCO,CCO) to generate separate arrays (LAR, CAR) of delta codes. The arrays (LAR,CAR) are received in a display apparatus via a limited bandwidth data channel (120). The data channel may in particular comprise an optical disc reading device. The arrays (LAR and CAR) are then expanded and combined to generate a desired array (DAR) of standard composite code words. By coding luminance and chrominance separately, the chrominance data can be coded at low resolution relative to a display chrominance resolution so as to obtain a faster image update rate with minimal loss of perceived image quality. The expanding and combining can be performed under program control in a standard display apparatus, for example a Compact Disc-Interactive (CD-I) player.

20 Claims, 5 Drawing Sheets

Fig.6.

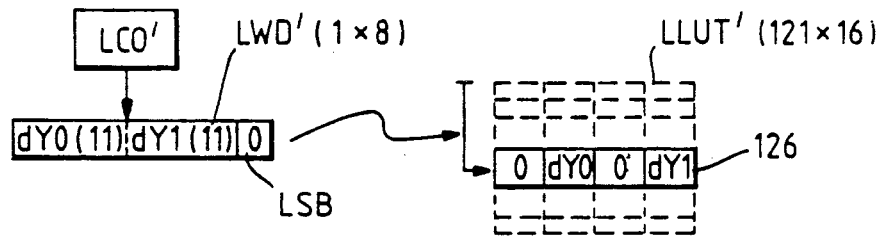

Fig.7.

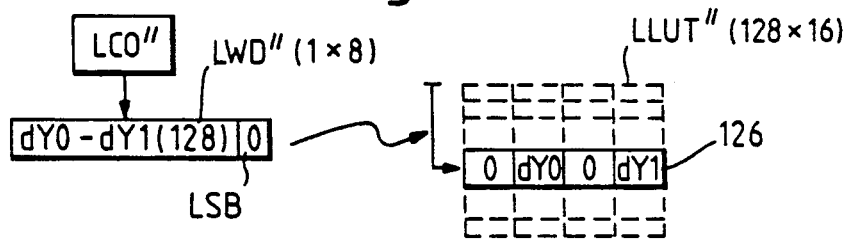

METHOD OF GENERATING A SERIES OF DPCM CODE WORDS, METHOD OF STORING COLOR IMAGE DATA, OPTICAL DISC WHEREON IMAGE DATA ARE STORED, AND DISPLAY APPARATUS

The invention relates to a method of generating in a display apparatus a series of differential pulse code modulation (DPCM) code words of a standard format, each standard code word of the series comprising a plurality of delta codes including at least one standard luminance delta code and one standard chrominance delta code defining, by reference to a standard set or respective standard sets of differential values, respective luminance and chrominance values for one or more of a corresponding series of pixels forming one line of a colour image at a display luminance resolution and a display chrominance resolution respectively, the method including the step of receiving in the display apparatus, via a data channel, information defining the series of standard code words.

In the present context, the term data channel should be understood in particular to include a data storage and retrieval system, wherein data can be read from a storage device, for example an optical disc, at a limited rate. Other data channels include, for example, telephone lines and radio links.

The invention further relates to a method of storing data representing one or more colour images, for example on an optical memory disc.

The invention still further relates to an optical disc whereon data representing one or more colour images have been stored in the performance of a method of the type set forth in the preceding paragraph.

The invention still further relates to a display apparatus comprising a decoder adapted for decoding a series of DPCM code words of the said standard format.

Differential coding for image transmission or storage is well known generally in the art, but a particular example is in the Compact Disc—Interactive system, defined by N. V. Philips' Gloeilampenfabrieken and Sony Corporation in the "Green Book" standard and described for example in "CD-I—a Designer's Overview" published by Kluwer (ISBN 9020121103). In the CD-I system, natural photographic images can be encoded into series of standard code words and recorded on an optical disc for subsequent retrieval, decoding and display by the CD-I player. The encoding technique used achieves a high degree of data compression, but the bandwidth of the data channel (the disc reading apparatus) is not high enough to permit sequences of such images to be displayed as moving pictures unless the images are limited to a small area of the available display screen. Similar limitations apply in many telecommunication data channels, for example in video-telephones and the like.

It is known that in principle images can be encoded at a relatively low resolution, transmitted through a data channel, and expanded within a display apparatus to fill a larger screen area. It is further known that satisfactory expansion of digitised images can be achieved by using linear interpolation to generate intermediate pixel values. The interpolation can be performed substantially independently in the line scan (hereinafter "horizontal") and field scan (hereinafter "vertical") directions.

Unfortunately, the differential nature of the coding in the known systems makes known interpolation techniques unsuitable, particularly in products such as the CD-I player which must conform to a standard and are aimed at the consumer market.

It is an object of the invention to enable the expansion of images by linear interpolation within an apparatus of the kind described, and in particular to do so in a manner which is technically compatible with existing standard coding systems such as that used in CD-I, and is relatively inexpensive to implement.

In a United Kingdom patent application No. 8830184.1, unpublished at the priority date of the present application, the applicants describe methods of expansion and interpolation in both horizontal and vertical directions by which smaller series of code words received from the data channel can be expanded within the standard CD-I player, with at least approximate interpolation. The methods described however, operate on entire code words so that luminance and chrominance resolution must be reduced by the same amount. In the CD-I system, for example, it would be advantageous to be able to reduce the chrominance resolution more than the luminance resolution, to obtain data compression with minimal loss of image quantity. In different applications, the acceptable degrees of compression will vary, and it should be noted that all of the techniques described herein for expansion of chrominance data in a CD-I system could be applied equally well to the luminance data.

The invention provides a method of generating in a display apparatus a series of differential pulse code modulation (DPCM) code words of a standard format, each standard code word of the series comprising a plurality of delta codes including at least one standard luminance delta code and one standard chrominance delta code defining, by reference to a standard set or respective standard sets of differential values, respective luminance and chrominance values for one or more of a corresponding series of pixels forming one line of a colour image at a display luminance resolution and a display chrominance resolution respectively, the method comprising the steps of:

(a) receiving from an image source at a source resolution luminance and chrominance values for a source series of pixels forming a line of a source image;

(b) differentially encoding at a first resolution the luminance values of the source series of pixels using a first predetermined (luminance) set of quantisation levels to generate a first series of code words comprising delta codes representing only luminance values, the first resolution being equal, in a line scan ("horizontal") direction, to the display luminance resolution divided by a first integer factor $H_L$ (one or greater);

(c) differentially encoding at a second resolution at least one chrominance value for each pixel of the source series of pixels using a second (chrominance) predetermined set of quantisation levels to generate a second series of code words comprising delta codes representing only chrominance values the second resolution being equal, in the horizontal direction, to the display chrominance resolution divided by a second integer factor $H_C$, $H_C$ being greater than $H_L$; the method further comprising performing, within the display apparatus, the steps of:

(d) receiving via a data channel the first and second series of codes generated in the steps (b) and (c);

(e) generating from the first (luminance) series of code words received via the data channel, and from information stored in the display apparatus defining the first resolution in terms of the display luminance resolution and the first set of quantisation levels in terms of the or the respective standard set of differential values, a series of standard luminance delta codes defining luminance values for a series of pixels at the display luminance resolution;

(f) generating from the second (chrominance) series of code words received via the data channel, and from information stored in the display apparatus defining the second resolution in terms of the display chrominance resolution and the second set of quantisation levels in terms of the or the respective set or sets of differential values, a series of standard chrominance delta codes defining chrominance values for a series of pixels at the display chrominance resolution; and (g) combining the generated standard luminance delta codes with the generated standard chrominance delta codes to generate the said series of standard code words.

By transmitting or storing separate series of codes for luminance and chrominance, the constraints imposed by the standard code word structure are reduced and freedom is gained to apportion the channel bandwidth between the two quantities differently with respect, for example, to the resolution or the number of quantisation levels with which each is encoded. It is even possible by such a method to update the luminance values of pixels at a different rate to the chrominance values.

The factor $H_L$ may be equal to one, so that the luminance component is encoded at the full display resolution. In the CD-I system, for example, the chrominance resolution can be reduced by a factor of 2 or even 4 without apparent loss of quality, whereas any reduction in the luminance resolution is found to be noticeable.

Each of the second (chrominance) set of quantisation levels may be a sum of $H_C$ standard differential values while each chrominance-only delta code in the second series of code words is expanded in the step (f) into a group of $H_C$ standard chrominance delta codes. In this way a received differential value can be shared out between a number of pixels, so as to expand the image in the horizontal direction and effect at least approximate linear interpolation. If the $H_C$ standard codes in each group are all equal, then the interpolation is exact.

The second (chrominance) resolution in a field scan ("vertical") direction may be an integer factor $V_C$ lower than the display chrominance resolution in the vertical direction, and after the step (f) the method may further comprise a step of:

(f2) combining the series of standard chrominance delta codes generated in step (f) to define chrominance values for one line of the image with a further series of standard chrominance delta codes similarly generated to define a further, neighbouring line of the image to generate at least one intervening series of standard chrominance delta codes also divided into groups of $H_C$ delta codes, each group of $H_C$ delta codes of the intervening line comprising a predetermined mixture of the $H_C$ delta codes in the corresponding groups of the said series and the said further series of standard chrominance delta codes, so as to define an intervening line of the image in which chrominance values are interpolated between corresponding chrominance values in the one line and the neighbouring line of the image. In this way, horizontal expansion with exact linear interpolation can be combined with vertical expansion with approximate linear interpolation to obtain further compression of the chrominance data.

For the performance of step (e) at least part of the said information may be stored in the display apparatus in the form of a luminance look-up table, each code word of the first series defining the address of an entry in the look-up table, which entry contains a corresponding one or more standard luminance delta codes.

Similarly, for the performance of step (f) at least a part of the said information may be stored in the form of a chrominance look-up table, each code word of the second series defining the address of an entry in the look-up table, which entry contains a corresponding one or more standard chrominance delta codes.

The use of look-up tables provides a fast method by which dedicated hardware or more importantly, a general purpose microprocessor included in a standard display apparatus, can effect the required translation, so that the standard codes can be generated more quickly than if they were received directly from the data channel. Because of the separate treatment of luminance and chrominance each look-up table can be made to occupy very little memory capacity.

The luminance delta code or codes generated in step (e) may be in accordance with the standard code word format, with bit positions for the missing chrominance delta codes filled with masking bits. Similarly, the chrominance delta codes generated in step (f) may be in accordance with the standard code word format, with bit positions for the missing luminance delta codes filled with masking bits. In either case, the step (g) may comprise forming a logical combination of the codes generated in steps (e) and (f) in such a manner that the masking bits become overwritten by the missing chrominance and/or luminance delta codes respectively. In this way the number of logical manipulations required to perform the expansion can be reduced.

The method may further comprise the step of:

(d2) receiving via the said data channel, in advance of the first and second series of code words, configuring information including the information required to be stored in the display apparatus for the performance of step (e), and/or step (f). In this way, the display apparatus need not be specially constructed or otherwise permanently configured to perform the method or any one embodiment of it.

In particular, the said configuring information may include program data for a microprocessor in the display apparatus.

The said program data may enable the steps (e),(f) and (g), and the step (f2) if included, to be performed automatically by the display apparatus upon receipt of the first and second series of code words from the data channel. The expansion can then be performed using standard hardware such as the standard CD-I player, significantly upgrading the performance of the existing consumer hardware without the need for up-graded or "add-on" hardware.

The invention further provides a method of storing data representing one or more colour images, the method comprising: generating, in accordance with steps (a), (b) and (c) of a method in accordance with the invention set forth above, a first and a second series of codes for each of a number of lines of each image; and storing the said series of codes in a storage device.

The method may comprise the further step of storing in the storage device configuring information for reading in accordance with step (d2) of the said method, if included.

The invention still further provides an optical memory disc whereon data representing a colour have been stored by such a method.

The invention still further provides a display apparatus comprising a decoder adapted for decoding a series of DPCM code words of a standard format, each standard code word of the series comprising a plurality of delta codes including at least one standard luminance delta code and one standard chrominance delta code, by generating therefrom, with reference to a standard set or respective standard sets of differential values, respective luminance and chrominance values for a corresponding series of pixels forming a line of a colour image to be displayed, at a display luminance resolution and a display chrominance resolution respectively; the display apparatus further comprising:

means for receiving from a data channel a first (luminance) series of codes and a second (chrominance) series of codes, generated in accordance with steps (a), (b) and (c) of a method as set forth above, and means for generating from the received series of codes a series of standard code words in accordance with steps (e),(f) and (g) of the said method.

The generating means may comprise a microprocessor under control of program data received via the data channel in accordance with step (d2) of a method as set forth above. This may enable a display apparatus in accordance with the invention to be provided using existing and/or standard hardware, so as to increase the capability of the existing display apparatus to display images in general, and motion pictures in particular.

The receiving means may comprise a device for reading the said series of codes from an optical memory disc under control of the microprocessor. Such an apparatus may for example comprise a CD-I player configured by the said program data to offer an improved performance without the need to extend or violate the "Green Book" standard.

Embodiments of the invention will now be described, by way of example, with reference to the accompanying drawings in which:

FIGS. 6 and 7 illustrate modifications of the method of FIG. 3;

FIG. 8 illustrates four examples (a) to (d) of combined horizontal and vertical interpolation.

Figure 1:
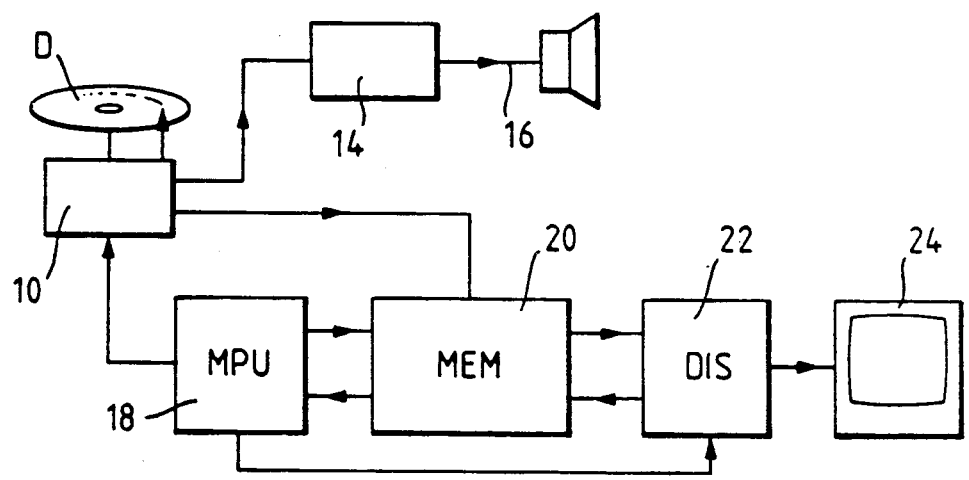
FIG. 1 shows in block schematic form a display apparatus suitable for implementing the present invention.

FIG. 1 shows in block schematic form a display apparatus of suitable for implementing the present invention. In the embodiments to be described, a limited-bandwidth data channel is formed by the output of a disc-reading device 10. The device 10 may be a magnetic disc drive, but in particular it may be an optical Compact Disc (CD) drive, of the form well-known for digital audio reproduction (CD-DA). As in the CD-DA system, the device 10 directs a reading head to appropriate parts of a disc D and passes information read from the disc to a sound decoder 14 which provides an audio output at 16.

It is also known, however, that optical discs and the CD format in particular have wider applications than digital audio, and in accordance with a development of the Compact Disc known as Compact Disc-Interactive (CD-I), the apparatus also includes a general-purpose microprocessor 18 which controls the device 10 and can direct parts of the data read from the disc D to a memory 20 rather than directly to the sound decoder 14. The data may in particular comprise programs for the microprocessor 18 and encoded picture information. In addition to the standard CD-I player, such an apparatus as that shown might alternatively comprise a general purpose computer (with a display) connected to a Compact Disc-Read Only Memory (CD-ROM) drive.

A display controller 22 continually reads appropriate parts of the memory 20 and decodes the data stored therein to generate images on a display device 24 such as a TV monitor. Pictures can be encoded according to many different formats, such as straightforward RGB (red, green and blue) values or run length coded values. In the example of CD-I, differential pulse-code modulation (DPCM) is used to achieve a compact presentation of the video information. Various DPCM formats are known, and by way of example only this description will refer to the system known as DYUV (Differential YUV) which is used in the CD-I system to convey natural photographic images, and in particular moving picture sequences.

Figure 2:
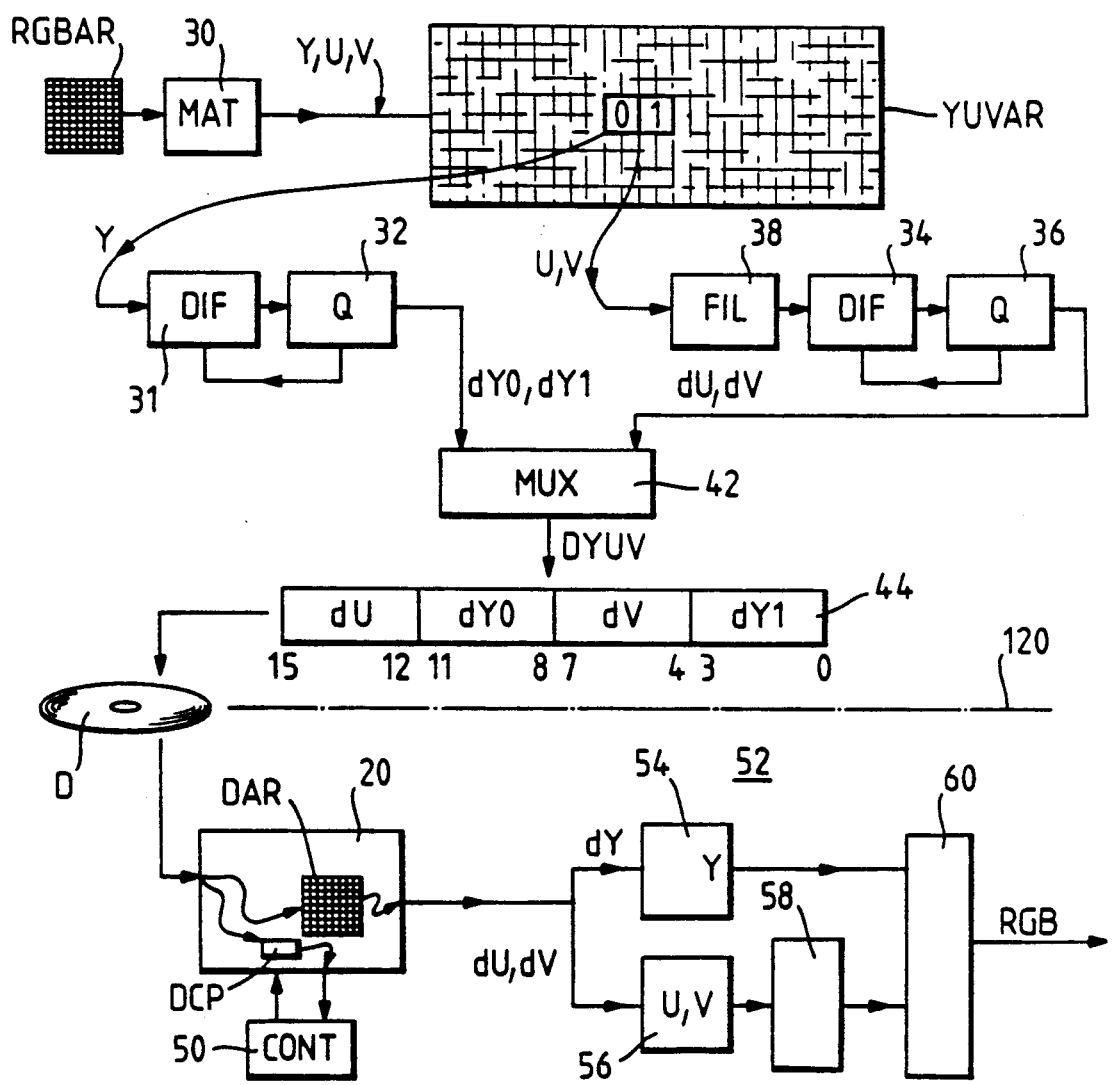
FIG. 2 shows a known system for storing digitised images, including part of the apparatus of FIG. 1.

The part of FIG. 2 above the chain-dotted line 120 shows in block schematic form a known encoder for converting digitised RGB images to DYUV format. An array RGBAR of red, green and blue values for the pixels of the image is received from the image source, which may for example be a video camera, a recording or a computer graphics generator. The whole image in a PAL-compatible system may for example contain 280 lines of 384 pixels, and at 24 bits per pixel (8 for each of R, G and B) the amount of data required to represent a full image in full RGB coding would be $280 \times 384 \times 24$ bits or about 315 kilobytes. Such a large amount of data would take nearly two seconds to read from a compact disc or equivalent data channel so that realistic moving picture retrieval would be impossible.

In the DYUV encoder shown above the line 120 in FIG. 2, the RGB values for each pixel are converted in a matrix circuit 30 to three 8-bit values Y, U and V to form a further array YUVAR. As in conventional colour television transmission, Y defines the luminance of the pixel and U and V are two colour difference values defining its chrominance. The Y value for each pixel is then passed to a differential encoder comprising a differencing circuit 31 and a quantiser 32. In the differencing circuit 31 the Y value for each pixel is compared with that of the previous pixel (or with a fixed value for the first pixel in each line). The difference is passed to the quantiser 32 where it is quantised and encoded as a four-bit luminance delta code dY in accordance with a predetermined code scheme such as that shown in Table 1 below. The delta code can take any value from 0 to 15, to represent one of a non-linear range of quantisation levels from $-79$ to $+128$ such as those shown in the second column of Table 1. Since the actual difference values will generally fall between two of the predetermined quantisation levels, any error is fed back to the differencing circuit 31 to avoid accumulation of errors.

TABLE 1

| Code | Quantisation Level | x2 | x3 |
|---|---|---|---|
| 0 | 0 | 0 | 0 |
| 1 | 1 | 2 | 3 |
| 2 | 4 | 8 | 12 |
| 3 | 9 | 18 | 27 |
| 4 | 16 | 32 | 48 |
| 5 | 27 | 54 | 81 |
| 6 | 44 | 88 | — |
| 7 | 79 | — | — |
| 8 | 128 | — | — |
| 9 | −79 | — | — |
| 10 | −44 | −88 | — |
| 11 | −27 | −54 | −81 |
| 12 | −16 | −32 | −48 |
| 13 | −9 | −18 | −27 |
| 14 | −4 | −8 | −12 |
| 15 | −1 | −2 | −3 |

A second differencing circuit 34 and a second quantiser 36 are shared between the U and V values, but before the U and V values are supplied to the circuit 34, they are passed through a sub-sampling low-pass filter 38 so that only one U and V value is encoded for a pair of pixels such as the pair numbered 0 and 1 in the representation of the array YUVAR. This low-pass filtering is acceptable because the human eye is known to have a relatively low spatial resolution for chrominance information compared with that for luminance. The filter 38 could operate by simply ignoring every other pixel, but to avoid aliasing effects it is preferable that at least the averages of the U and V values for each pair (0,1) of pixels are found and passed to the circuit 34.

It follows that for every pair of pixels defined by the input RGB values, the quantisers 32 and 36 produce two dY codes, one dU code and one dV code. These codes are combined by a multiplexer 42 to form a sixteen-bit "DYUV" code word 44 for each pixel pair (0,1). Bits 0 to 3 contain the dY code for the second pixel in the pair (dY1), bits 4 to 7 contain the dV code for the pair, bits 8 to 11 contain the dY code for the first pixel (dY0) and bits 12 to 15 contain the dU code for the pair.

The DYUV code words 44 for every pixel pair on every line of the image can be stored in a space of 384×280×16/2 bits which is about 105 kilobytes—one-third of the space required for a full RGB image. Therefore by storing an array DYUV code words on the disc a full-screen, normal resolution image can be read from the optical disc (or any data channel operating at about 170 kbytes/sec.) in about two-thirds of a second.

In the apparatus shown in FIG. 1 the DYUV code words are read from the disc by the device 10 and transferred directly into an array DAR in the memory 20. The part of FIG. 2 below the line 120 shows in more detail the memory 20 and part of the display controller 22 by means of which the DYUV words are decoded synchronously with the display scanning. The memory 20 can be divided into two banks, each bank serving as a display memory for one of two display channels A and B which can be used to combine two different images in various ways (for example mattes, colour keying, fading etc.) to afford a versatile range of display options. For the purposes of the present description, only one channel is shown.

Once in the memory 20, the data is addressed under the control of a control section 50 of the display controller 22. Also stored in the memory 20 is a Display Control Program (DCP) which tells the control section 50 which locations in the memory 20 contain the array DAR and to which area of the screen it corresponds. Using the information in the DCP, the control section 50 then generates the addresses required to scan the array DAR 20 synchronously with the raster scan of the display screen 24 (FIG. 1).

The DYUV code words read from the memory 20 are passed to a dedicated real-time decoder circuit which splits the DYUV words into their 4-bit components. The incoming dY codes are passed to a differential decoder 54 which generates 8-bit Y values by adding the differential value represented by the incoming dY code (see Table 1) to the Y value of the previous pixel. Similarly the 4-bit dU and dV codes are passed to a second differential decoder 56, which generates alternately the 8-bit U and 8-bit V values. It will be remembered that the U and V values are encoded at a resolution of 2 pixels, half the horizontal resolution of the Y values. The U and V values are therefore passed to an interpolator 58 which replaces the missing U and V values by forming the linear average of the two adjacent values. The decoded Y, U and V values are then fed to a matrix circuit 60 which converts YUV to RGB format to give a signal RGB suitable for passing to the display device 24.

Since the decoding circuitry operates in real-time, synchronously with the display scanning, it will be appreciated that the factor which most severely limits the ability of the known apparatus to display moving pictures is the rate at which data can be read from the optical disc or other data channel (one full image every two thirds of a second). To display moving images a refresh rate of at least 12 and preferably 24 to 30 images per second is necessary. Different techniques may be adopted to increase the image refresh rate. One technique would be to use a more highly compressed coding technique such as that developed for the Digital Video Interactive (DVI) system, described for example in U.S. Pat. No. 4,785,349. However, the DVI coding demands very powerful computing apparatus to encode the images, and the real-time decoders required are too expensive for consumer products.

Within a consumer product such as CD-I, a simple method of reducing the amount of data required for moving pictures is simply to reduce the area of the screen that is used for moving pictures. For example, if the standard dYUV coding is used but the displayed area is reduced to 10 percent of the full screen area, the coded display information is reduced to about 10 kilobytes, thus enabling new images to be displayed refreshed at a rate of 15 per second. However, if the horizontal and/or vertical display resolution were reduced by some factor, then the coded data required could also, in theory be compressed for storage by the same factor, enabling the updated screen area to be increased for the same data rate.

Reducing the resolution in the line scan (horizontal) direction and/or field-scan (vertical) direction will inevitably reduce the ability of the viewer to perceive fine detail, but it is found that the human viewer is not sensitive to fine detail in moving pictures. Even so, the techniques hitherto available for expanding the received image are unsatisfactory either because of their expense or poor performance. One such solution is to display each received pixel value over a small block of pixel locations. This technique is available within the basic CD-I player, but has the disadvantage that the resultant "mosaic" effect is unnatural and visually obtrusive to viewers. A better solution is to generate additional pixel values by linear interpolation so that each intermediate pixel has a value which is the arithmetic mean of the adjacent pixels. Because the interpolation is linear, the interpolated values may be computed in two separate stages, first in the horizontal or line scan direction and then in the vertical or field scan direction, or vice versa.

A problem arises in differentially coded systems such as the DYUV system described above, in that the actual pixel values may not be available until they are actually displayed. To save memory space in the CD-I system, for example, each image is stored as received in the array DAR of DYUV code words in the memory 20 (FIG. 1) and decoded in real-time by the display controller 22 for each scan of the display. The microprocessor 18 does not have sufficient power to decode the DYUV signals, perform linear interpolation and then re-encode to DYUV in the time available. Any specialised processor for this purpose would greatly increase the cost of the system and in the case of CD-I would be incompatible with the agreed standard.

Figure 3:
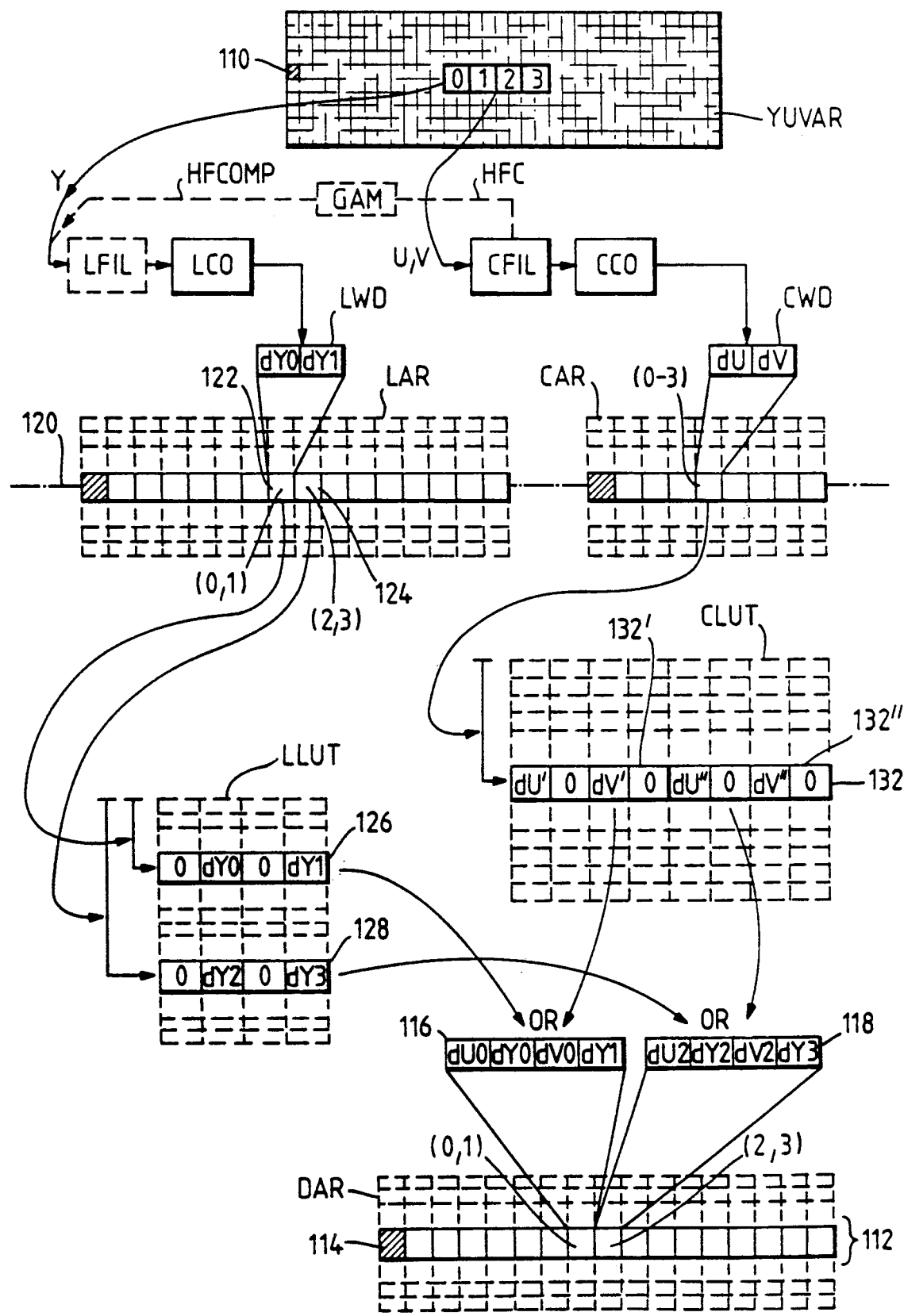
FIG. 3 illustrates a method in accordance with the invention, which is compatible with the apparatus of FIG. 1 wherein chrominance information is compressed horizontally.

In the method illustrated in FIG. 3, the values Y, U and V are found, to 8 bits per pixel, as in the known system, and an array YUVAR is made of the values for the image, with the pixel values for a particular line of the image being highlighted at 110. For the sake of this example, a representative group of four pixels in the line 110 are numbered 0,1,2 and 3. Although the arrays in FIG. 3 are shown in two dimensions, they will generally be stored in linear blocks of memory, one line following another.

The aim of the method is to arrive at an array DAR comprising a number of series of DYUV code words in the memory 20 of the CD-I player, one series 112 of which contains a number of standard 16-bit DYUV code words. A first pixel value is coded separately at 114. Each standard DYUV word defines two pixels of the displayed image, so that representative code words 116 and 118 might define the pixel (0,1) and (2,3) respectively. However, in the new method, compressed data are transmitted through the limited bandwidth data channel (optical disc reader) represented as before by the chain-dotted line 120.

In FIG. 3, the luminance (Y) value and chrominance (U and V) values are passed through separate filters LFIL and CFIL respectively and through separate delta coders LCO and CCO to generate two separate arrays, LAR and CAR respectively, for transmission (storage on disc). In a first example, luminance array LAR comprises a number of series of 8-bit (byte) code words of a type LWD, each defining two dY delta codes for a pixel pair. One LWD for the pair (0,1) for is stored at 122 in the array LAR, while that for the pair (2,3) is stored at 124, and so on for all the pixels of the image. The horizontal resolution for luminance is therefore one pixel, with 4 bits per pixel (16 quantisation levels), as for the standard DYUV coding. The luminance filter LFIL may therefore be unneccessary and is shown dotted for that reason. The LWD byte 122 comprises the two nibbles dY0 and dY1 that are required in the final DYUV code word 116. A luminance look-up table LLUT comprising 256 16-bit entries is set up in memory and the byte 122 is used as an index into the table LLUT to retrieve a 16-bit entry 126 which contains the nibbles dY0 and dY1 in the standard DYUV format, with the dU and dV nibbles set to zero. The look-up table method is used to save processing time, although clearly, if time allowed, the word 126 could be built up by a sequence of logical operations on the LWD byte 122. Similarly, the LWD byte 124 is used as an index into the LLUT to find a DYUV-format entry 128 wherein the dY nibbles contain codes dY2 and dY3 relating to the pixels of the pair (2,3), and the dU and dV nibbles are again zero.

The chrominance values UV are filtered by the block CFIL to a relatively low resolution of four pixels, one half of the normal chrominance resolution and one quarter of the luminance resolution. The chrominance values U and V for the pixels 0,1,2 and 3 can then be quantised and coded together at CCO to generate a single byte code word CWD. The chrominance array CAR, comprising a number of series of CWD bytes, is thus substantially only half the size of the luminance array. Various formats are possible for the chrominance code word CWD. In the first example shown in FIG. 3, the byte CWD is simply divided into two nibbles dU and dV each of which codes the difference in U or V respectively across the four pixels (0,1,2,3), so that a range of up to 16 quantisation levels can be used for each. After reading the array CAR from disc into memory, the CWD 130 for the four pixels (0,1,2,3) is used as an index into a chrominance look-up table CLUT, also set up in advance. The CLUT comprises 256 entries each 32 bits wide, and the entry 132 addressed by the CWD 130 comprises two DYUV code words 132' and 132", with the dY (luminance) nibbles set to zero. The dU nibbles of the code words 132' and 132" are expanded have values dU' and dU" derived from the stored nibble dU. The dV nibbles similarly contain codes dV' and dV" derived from the stored nibble dV.

Figure 4:
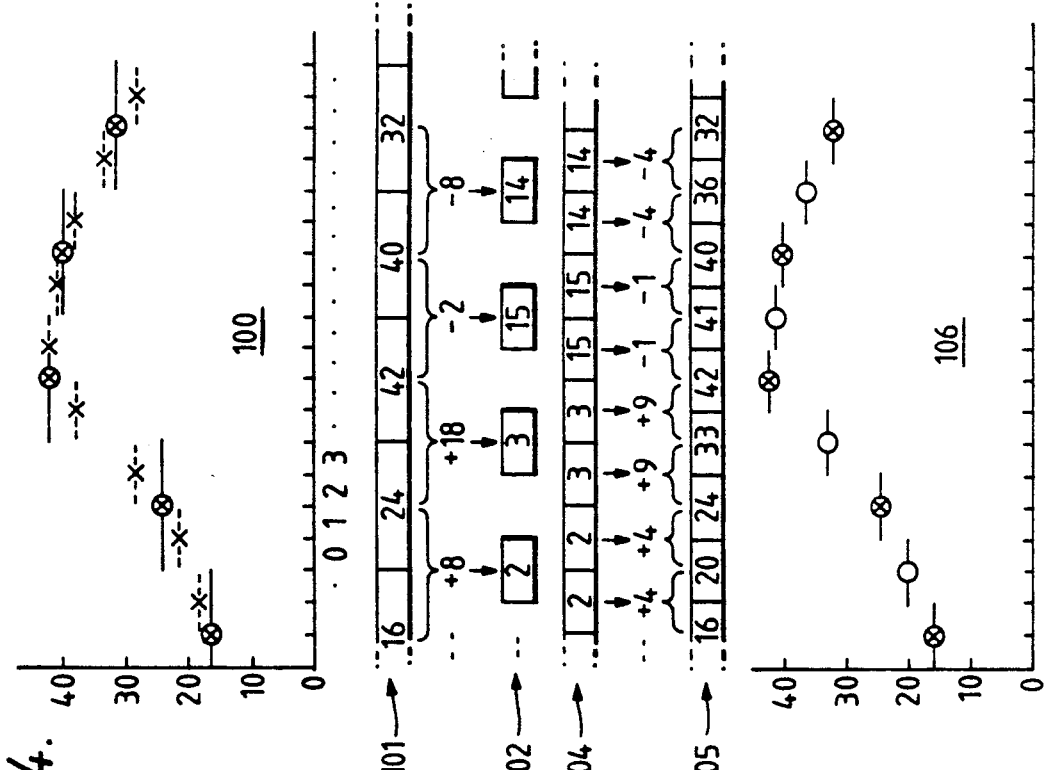
FIG. 4 illustrates the principle of horizontal interpolation in the method of FIG. 3.

FIG. 4 illustrates the method of encoding one of the chrominance values, U or V into a code nibble dU or dV and expanding it to generate the pair dU',dU" or dV',dV" as the case may be. The chrominance value, U or V, is plotted at 100 against pixel numbers 0,1,2,3 etc. In the standard DYUV coding system, the values U and V would be low-pass filtered to a resolution of 2 pixels and sampled once for every pixel pair (0,1),(2,3) etc. at the points marked with an 'x' on the graph 100. However, to achieve the desired compression, the U and V values are instead filtered (block CFIL, FIG. 3) to a resolution of 4 pixels and sampled only once for each group (0–3), etc. of four pixels at the points marked with a circled on the graph 100. At 101, the sampled values for these points are shown to be 16,24,42,40 and 32 respectively.

A column headed "x2" in Table 1 contains levels which are twice the standard quantisation levels in the first column, being undefined in three cases where the magnitude of the "x2" value would otherwise exceed 128. Once the initial value of 16 has been determined, differential values of 8,18,−2 and −8 define the remaining values, and these can be encoded (block CCO, FIG. 3) using the "x2" values in Table 1 as quantisation levels, rather than the Standard levels, to obtain a compressed series 102 of 4-bit delta codes 2,3,15,14.

The difference values 101 between pixels are all exactly equal to one of the quantisation levels ("x,2") in this example. In general, this will not be the case, any quantisation errors being included in the value for the next pixel as described above with reference to FIG. 2. The average size of the quantisation errors, the quantisation noise, depends on the number of quantisation levels available. Since there are 13 levels in the "x2" set, there will be only a small increase in quantisation noise compared with the standard DYUV coding.

Each of the codes in the series 102 can then be combined with a similar code ior the other chrominance component (V or U) for the same four pixels to form an 8-bit code word CWD and stored on the optical disc in the array CAR (FIG. 3), ready for reading by the display apparatus. After reading the array CAR, the microprocessor 18 apparatus expands each nibble dU or dV of each CWD into a pair of nibbles dU',dU" or dV',dV" respectively to create an expanded series 104 of codes which are then made part of the DYUV array DAR together with the corresponding codes for the second chrominance value and for luminance. The decoder 52A, or 52B in the display controller 22 then receives the pairs of codes in place of the single codes recorded on the disc, and consequently generates separate values for pixel pairs (0,1),(2,3) etc. instead of only one value for a group of four pixels, as shown at 105 and in the lower graph 106.

In this example the coded pairs dU',dU" (dV',dV") simply duplicate the received codes dU (dV). Because the decoder in the display apparatus operates using the standard quantisation levels (second column, Table 1) and chrominance values of the filtered image were encoded using the "x2" levels, the pixel pairs marked by circled crosses have the correct values 16,24,42,40,32, etc., while the intervening pixel pairs marked by empty circles have values 20,33,41,36 etc. which lie exactly midway between the adjacent pixel pairs, leading to a perfect linear interpolation between the encoded values.

It may be noted that this same principle of expansion and linear interpolation is also applied in the above-mentioned copending United Kingdom application No. 8830184.1, unpublished at the priority date of the present application. However, in that other application, the apparatus receives 16-bit composite code words containing both luminance and chrominance data from which pairs of DYUV code words are generated directly by a one-to-one mapping. That technique has two disadvantages. Firstly, using a full 16-bit word as an offset requires a very large look-up table, 256K bytes for an expansion factor of 2. Secondly, the resolution of luminance (Y) and chrominance (UV) are both reduced by the same factor, which may not be ideal. In fact, the perceived quality of the image is degraded unnecessarily because, the UV resolution (horizontally), even though it already only half the Y resolution, is still in excess of that necessary for a satisfactory image. The reduced Y resolution, on the other hand, causes a noticeable degradation in quality.

It would be possible in that earlier case to reduce the number of bits of the transmitted code word used for chrominance more than the number of bits used for luminance, to a theoretical minimum of two chrominance bit per received code word (one U and one V), but only by reducing the number of quantisation levels used in the encoding process, rather than reducing the spatial resolution. Reducing the available quantisation levels increases quantisation noise, leading to an impression of "boiling" in the moving pictures displayed. In contrast, separating the luminance and chrominance data into separate arrays in accordance with the invention allows the chrominance resolution to be reduced independently of the luminance resolution, and without increasing quantisation noise unduly.

In other embodiments, U and V (or other chrominance component pair such as I and Q) could be encoded separately, so that a third series of code words would be transmitted for each line, in addition to the first and second series mentioned in the introduction. This might be advantageous if it were desired to encode the two chrominance components at different resolutions, or with different numbers of quantisation levels.

Figure 5:
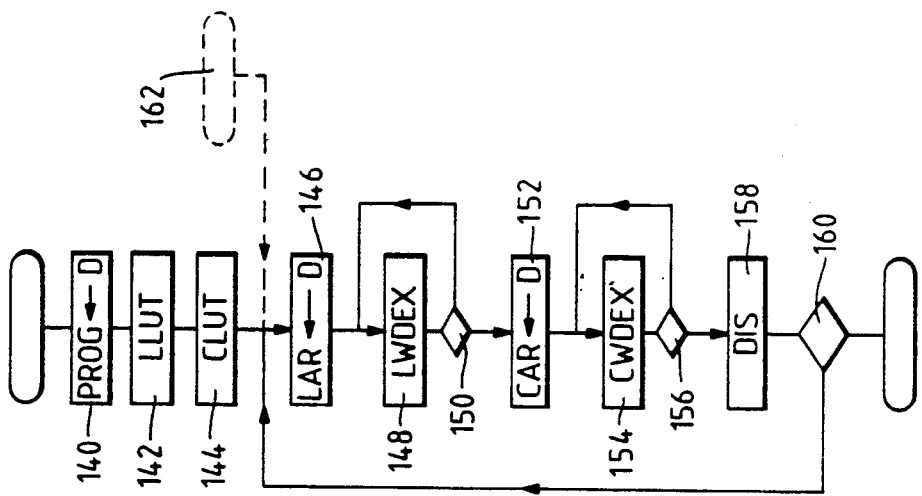
FIG. 5 is a flow diagram embodying the part of the method of FIG. 3 which is performed within the display apparatus.

FIG. 5 is a flow diagram which shows the steps performed by the display apparatus in implementing the embodiment illustrated in FIGS. 3 and 4. In a first step 140, a controlling program PROG is loaded from the data channel (optical disc D) so that the microprocessor 18 can implement further steps 142-160 of the method. In step 142 the luminance look-up table LLUT is constructed in a suitable part of the memory 20 from data read from the data channel (disc D). The LLUT may be stored on the disc in its complete form, or it may be generated under control of a short program routine, particularly in embodiments where the relationship between the index values and the corresponding entries in the LLUT is a logical one, such as the example illustrated in FIG. 3. In step 144, the chrominance look-up table CLUT is similarly constructed at another location in the memory 20.

The steps 140 to 144 form an initialisation routine which does not need to be performed again so long as the LLUT, the CLUT and the necessary program instructions remain stored in memory. The steps 146 to 158 on the other hand form a routine for displaying one compressed image by the method illustrated in FIGS. 3 and 4. To enable the display of a sequence of images for motion video, a loop test step 160 causes the routine to be repeated for each image until the sequence is ended. As shown dotted at 162, the routine can be executed again from step 146 without repeating the initialisation steps 140 to 144, to display a further motion picture sequence at any time.

Step 146 causes the luminance array LAR of a stored image to be read from the disc and stored in the memory 20. In the CD-I player, there is direct access from the disc-reading device 10 to the memory 20, so that the microprocessor 18 need only issue a single relatively high level instruction to the device 10 for the entire array LAR to be loaded. A step 148 is executed to read one LWD (122) from a series in the array LAR, to use it as an index into the LLUT and to copy the corresponding LLUT entry (126) into the DYUV array DAR, stored at some other location in memory. A loop test step 150 ensures that every CWD in every series in the array LAR is used in turn. Steps not shown are also provided to ensure that an appropriate code (114) is entered into the DYUV array DAR to define the starting pixel value for each row of the image.

In step 152 the compressed chrominance array CAR is loaded from the disc into memory. Because of the direct access feature mentioned above, the steps 146 and 152 may not have a rigid place in the method represented serially by the flow chart, so that the step 152 may in fact have been initiated before executing the loop 148,150, so that the array CAR is already being loaded while the array LAR is being expanded. A step 154 expands one CWD from the array CAR using the CLUT and OR's the expanded code words (132',132") into the appropriate locations of the DYUV array DAR, so as to complete the DYUV code words (116,118). A loop test step 156 ensures that every CWD in every series in the array CAR is expanded, after which the DYUV array DAR is complete in the memory 20.

Step 158 generates a display control program (DCP) containing the address of the array DAR. The DCP is read by the display controller 22, which then reads and decodes the series of DYUV code words in the array DAR to display the corresponding lines of the image, exactly as if the DYUV code words had been read directly from the disc. If another image is to be displayed, the step 160 returns control to step 146 and the process is repeated for another pair of arrays LAR and CAR. Double buffering may be used, at least for the DYUV array DAR, so that one image can be displayed while the array DAR for the next image is being constructed in another part of memory.

The advantages of compressing the data to achieve faster image update for motion video cannot be fully realised unless the expansion can be performed in the display apparatus at least as quickly as the arrays LAR and CAR can be read from the disc. The "time-critical" parts of this operation are the steps 148 and 154, which are executed many times. At the CD-ROM (Form 2) data rate of 170 kilobytes per second, one byte LWD or CWD will be received almost every 6 microseconds.

To implement the example of FIG. 3, for each CWD byte expanded two LWD bytes must be expanded. These three bytes can be read from disc in approximately 20 microseconds, or 300 cycles for the Philips PCN68070 microprocessor which runs at 15 MHz in a CD-I player, so that the microprocessor 18 must be able to perform step 148 twice and step 154 once in under 300 cycles. Listing 1 below defines a routine LWDEX for performing the step 148, while Listing 2 below defines a routine CWDEX for performing the step 154. These assembly language listings will be largely self-explanatory to those skilled in the art, the PCN68070 being code compatible with the well-known MC68000 microprocessor. Equivalent functions can of course be performed by any general purpose microprocessor, or by more dedicated sequencing circuits, for example if a separate hardware look-up table memory were to be used instead of the main memory of a display apparatus such as a CD-I player.

Listing 1 - LWDEX

| Line No. | Operation | Explanation |
|---|---|---|
| 1.1 | MOVEQ.L #0,D0 | ;Clears a 32-bit register D0 ;(7 cycles) |
| 1.2 | MOVE.B (A1)+,D0 | ;Address register A1 points to ;byte LWD in LAR. Load LWD into ;D0 and increment pointer ;(11 cycles). |
| 1.3 | ADD.W D0,D0 | ;Left shift to create index ;into 16-bit wide LLUT ;(7 cycles) |
| 1.4 | MOVE.W 0(A2,D0.W),(A3)+ | ;A2 points to base of LLUT. A3 ;points to desired location of ;DYUV word in DAR. Copy ;expanded word from LLUT into ;DAR using lower word of D0 as ;index and increment A3 ;(25 cycles) |

Listing 2 - CWDEX

| Line No. | Operation | Explanation |
|---|---|---|
| 2.1 | MOVEQ.L #0,D0 | ;Clear 32-bit register D0 ;(7 cycles) |
| 2.2 | MOVE.B | ;A1 points to CWD in CAR |
| | (A!)+,D0 | ;Load CWD into D0 and ;increment pointer (11 cycles) |
| 2.3 | LSL #2,D0 | ;Double left shift to create ;index into 32-bit wide CLUT ;(19 cycles) |
| 2.4 | MOVE.L 0(A2,D0.W),D1 | ;A2 points to base of CLUT. ;Copy expanded words from CLUT ;into register D1 (25 cycles) |
| 2.5 | OR.L D1,(A3)+ | ;A3 points to pair of DYUV words ;in DAR. Writes dU and dV ;nibbles into DYUV words by OR ;combination to preserve the dY ;nibbles already written ;(15 cycles) |

The execution time for each instruction is given in brackets in the "explanation" column of the listings, the totals for LWDEX and CWDEX being 50 cycles and 77 cycles respectively. Even allowing for the overheads involved in setting up the pointers and implementing the loop tests 150 and 156, it can be seen that LWDEX can be executed twice and CWDEX can be executed once in well under 300 cycles. This in turn means that the full compression of the data read from disc from 8 bits per pixel to 6 bits per pixel can be utilised, so that the updated screen area can be increased to 13%.

Co-pending United patent application No. 8830210.4 (PHB33520), unpublished at the priority date of the present invention, describes two methods of vertical (field-scan direction) interpolation which are implemented by periodically reconfiguring the display controller 22 so as to display extra interpolated lines between those defined by the lines (112) in the DYUV array. Allowing for a two-fold vertical expansion by this method, then 27% of full screen area can be updated at 15 Hz. While this figure is not as great as the 40% achieved by the method described in the above mentioned application No. 8830184.1 (PHB33519), it should be remembered that the full standard horizontal resolution and low noise has been retained for luminance, while the horizontal chrominance resolution, although reduced to four pixels, is still higher than that achieved for example by domestic VHS video cassette recorders.

Various further examples modifying the method described above will now be described with reference to FIGS. 6 to 9. These modifications either increase the compression obtained (including vertical compression in the case of FIGS. 8 and 9) or simplify the decoding, variously at the expense of reduced resolution and/or increase quantisation noise. Thus some of the examples may be more suitable for transmitting or storing large numbers of still pictures (high resolution, high noise) whereas others may be more suitable for the transmission or storage of motion pictures (low resolution, low noise). The designer of a CD-I application can choose relatively freely between these and other variations, since the standard CD-I hardware may be used in all cases. A CD-I authoring system may even advise automatically on the combinations available, and on which method will best suit a particular situation. In other display apparatuses, it may be that hardware dictates that only certain embodiments are suitable.

In FIGS. 6 and 7, modified luminance code bytes LWD' and LWD" respectively have their least significant bit (lsb) permanently set to zero. This avoids the need to shift the code word in order to generate the index into the 16-bit wide look-up table LLUT (for example line 1.3 of Listing 1). This relieves some burden from the microprocessor 18, while maintaining the full single-pixel resolution, but at the expense of slightly increased quantisation noise.

In the FIG. 6 example, the codes dY0 and dY1 are coded each using a subset of 11 quantisation chosen from the 16 standard levels (Table 1). The smaller quantisation levels, +1, −1 etc. can be omitted without a noticeable degradation in most images. However, noise may be able to be minimised by using a different subset of levels from the two pixels in a pair. This provides 121 permutations which can be coded in the 7 more significant bits of the byte LWD'. The byte LWD' then serves directly as an index into a luminance look-up table LLUT' having 121 16-bit entries. In the FIG. 7 example, the seven bits are used fully to index a 128 by 16-bit luminance look-up table LLUT'', allowing greater flexibility in that the pair of pixels can be quantised using 128 possible level pairs for dY0 and dY1 combined, rather than quantising each pixel with an 11-level subset and then combining them to give 121 permutations. Both the types of code word LWD' and LWD'' can be expanded more quickly than the code word LWD in the first example, leaving the microprocessor more time for performing other functions related to other parts of the display, user input, sound and so on.

In a further example, not illustrated, the chrominance data could be reduced by a factor of three, rather than two, by filtering U and V (in block CFIL, FIG. 3) to a resolution of six pixels and quantising differential values for groups of six pixels using the levels in the column headed "x3" in Table 1, which are three times the corresponding standard levels, the codes 6,7,8 and 9 being undefined. Each received CWD byte could then be expanded using a 256 by 48-bit CLUT to generate the dU and dV nibbles of three successive DYUV words in the array DAR.

Similarly, a four times reduction could be attained by filtering to 8-pixel horizontal chrominance resolution, quantising using a "x4" set of levels, not shown in Table 1, and a 256 by 32-bit CLUT. In such a case, the highest defined level would be plus or minus 4×16=64, and only 9 quantisation levels would be defined, leading to a wasted channel capacity and excessive noise. However, it should be noted that when a look-up table is being used to expand the received CWD bytes, the expanded codes need not all be equal. For example, in the "x2" example, a quantisation level of 123 could be used, and expanded to a pair of codes 7 and 6 in the DYUV code words 116 and 118. This would give differential values of 79 and 44 for the relevant chrominance value (U or V) of the two pixel pairs (0,1) and (2,3). While this would not lead to exact linear interpolation because the values are not equal, there will be approximate interpolation at least, and the overall result may be better because of the reduced quantisation noise. Similarly, it may be useful for gradually shaded images to be able to use a quantisation level of plus or minus 1, the code being expanded to a pair of codes 0 and 1 or 0 and 1 respectively. A suitable set of 16 quantisation levels and code paris (code', code'') are presented in Table 2. Similar groups of non-equal codes may also be generated for "x3" and "x4" expansion, with an even more significant reduction of quantisation noise. It should also be remembered that expansion and interpolation by the above techniques can also be applied to the luminance values, if desired.

TABLE 2

| Code | Quantisation Level | Code' | Code'' | 1st Diff. | 2nd Diff. |
|---|---|---|---|---|---|
| 0 | 0 | 0 | 0 | 0 | 0 |
| 1 | 1 | 1 | 0 | 1 | 0 |
| 2 | 4 | 2 | 0 | 4 | 0 |
| 3 | 8 | 2 | 2 | 4 | 4 |
| 4 | 18 | 3 | 3 | 9 | 9 |
| 5 | 25 | 4 | 3 | 16 | 9 |
| 6 | 43 | 5 | 4 | 27 | 16 |
| 7 | 71 | 6 | 5 | 44 | 27 |
| 8 | 123 | 7 | 6 | 79 | 44 |
| 9 | −71 | 10 | 11 | −44 | −27 |
| 10 | −43 | 11 | 12 | −27 | −16 |
| 11 | −25 | 12 | 13 | −16 | −9 |
| 12 | −18 | 13 | 13 | −9 | −9 |
| 13 | −8 | 14 | 14 | −4 | −4 |
| 14 | −4 | 14 | 0 | −4 | 0 |
| 15 | −1 | 15 | 0 | −1 | 0 |

The above examples provide techniques by which the chrominance resolution can be reduced in the horizontal (line scan) direction to achieve data compression relative to the DYUV standard with minimal loss of quality. However, vertical expansion of chrominance data would also be advantageous, since an unnecessarily high vertical resolution will effectively negate some of the advantage gained by reducing the horizontal resolution. A general technique for combined vertical and horizontal expansion will be described, with a particular example of chrominance-only expansion being described with reference to FIG. 9. This general technique is the subject of another application, No. 07/509,686, having the same priority date as the present application.

Suppose that there are two lines of DPCM codes which are to be interpolated by a third line. The received lines may be represented thus:

a0, a1, a2, . . . an and
b0, b1, b2, . . . bn where a0 and b0 are initial pixel values (Y,U or V) and the remaining codes are differential values for the subsequent pixels.

Suppose further that the received codes are expanded for horizontal interpolation into pairs of equal codes representing two smaller differences, so that, for example, the difference an becomes expanded to an'+an'. This is the horizontal interpolation technique illustrated in FIG. 4. After horizontal expansion then, the two received lines become:

a0, a1', a2', a2', . . . an', an' and
b0, b1', b2', b2', . . . bn', bn'.

A vertically interpolated line can then be constructed by firstly ensuring that a0=b0=s0, in other words that all lines have the same initial value, and then by taking delta codes alternately from the two adjacent received lines to construct the interpolated line.

The resulting three lines of difference values will be:
s0, a1', a1', a2', a2', . . . an', an'
s0, a1', b1', a2', b2', . . . an', bn'
s0, b1', b1', b2', b2', . . . bn', bn'

Because differential coding is being used, the absolute values vala(2n), vali(2n) and valb(2n) for the 2n-th pixel on each of the three lines are given by the three expressions:

$$vala(2n) = s0 + 2(a1' + a2' \ldots an')$$

$$vali(2n) = s0 + (a1' + b1' + a2' + b2' \ldots an' + bn')$$

$$valb(2n) = s0 + 2(a1' + a2' \ldots an')$$

It can be seen by inspection that for the even pixels in the interpolated line $$vali(2n) = (vala(2n) + valb(2n))/2$$

This is an exact interpolation. For the odd pixels:

$$vali(2n+1) + (vala(2n) + valb(2n)/2 + a(n+1)'$$

which is only an approximate interpolation, but there is no cumulative error.

FIG. 8 shows patterns (a) to (d) in which the received codes can be expanded and interleaved to give different expansion factors H and V in the horizontal and vertical directions respectively. In each pattern, a basic repeating pattern is outlined, the complete picture being built up by writing each code an', bn', cn' etc. several times into an array at locations corresponding to the basic pattern. The number N of codes in each basic pattern gives the combined expansion factor for horizontal and vertical expansion. Patterns (a) and (b) are suitable where the "x2" quantisation has been used, so that the horizontal expansion factor H=2. Patterns (c) and (d) relate to cases where the "x3" quantisation has been used so that H=3. Various different patterns could be chosen for a given H and V, the choice being limited in practice to patterns, such as those illustrated, which can be repeated by simple translation to fill the plane of the image. Furthermore, the patterns (c) and (d) have been chosen to minimise any visible patterning of the displayed image, as those skilled in the art will appreciate.

While this combined vertical and horizontal interpolation is generally applicable to any or all pixel value components, a particular application is in the situation where a DYUV or similarly coded image has been received in the form of separate luminance and chrominance arrays, such as the arrays LAR and CAR mentioned above. In the standard DYUV system, the chrominance resolution is half the luminance resolution in the horizontal direction (2 pixels and 1 pixel respectively), but the same (1 line) vertically, thereby effectively wasting channel capacity on unnecessarily high vertical chrominance resolution. In the method illustrated so far by FIGS. 3, 4 and 5, whereas the chrominance resolution is reduced to 4 pixels horizontally compared with 1 pixel for the luminance, the vertical resolution remains at 1 line for both luminance and chrominance, leading to further inefficiency due to unnecessarily high vertical chrominance resolution.

Since the luminance and chrominance arrays LAR and CAR are separate, however, it is possible to use the technique described above and illustrated in FIG. 8 to expand the chrominance data both horizontally and vertically, relative to the luminance data. In particular, if the pattern of FIG. 8(b) were used for the chrominance expansion and the luminance resolution remained at the normal standard level (1 pixel by 1 line), then the chrominance resolution would be a quarter of the luminance resolution both vertically and horizontally, leading to a more efficient use of the data channel, enabling the display of relatively highly compressed images without excessive loss of quality in any one respect.

Figure 9:
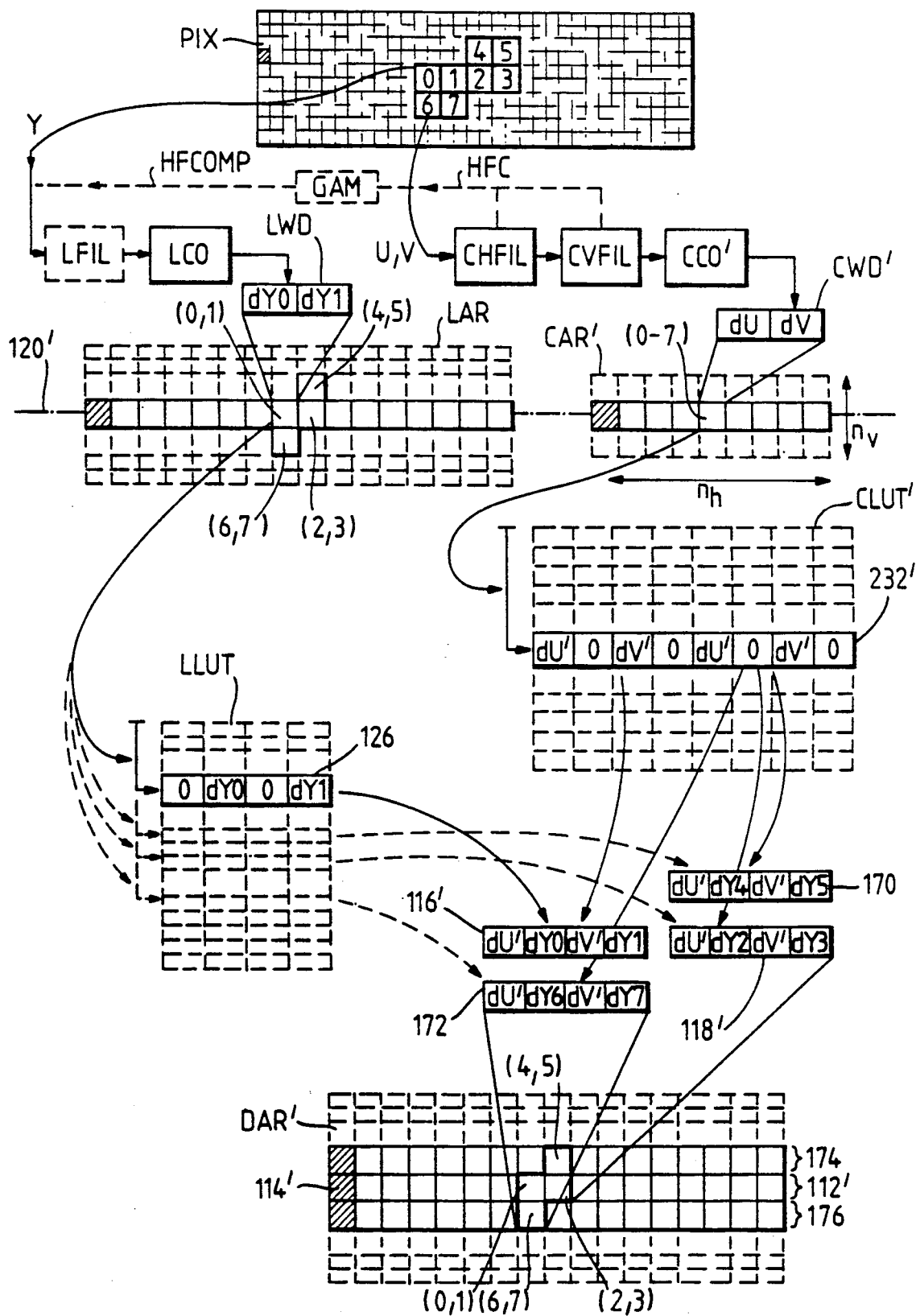
FIG. 9 illustrates the method of FIG. 3 modified to implement combined horizontal and vertical interpolation in accordance with the example of FIG. 8(a).

FIG. 9 is a modified version of FIG. 3, in which this vertical chrominance expansion is incorporated using the pattern of FIG. 8(a). Listing 3 presents a routine CWDEX', which is a modification of the routine CWDEX to incorporate the vertical expansion. Those skilled in the art will readily appreciate how the system can be adapted to give a number of different combinations of luminance and chrominance information at different vertical and horizontal resolutions, using the patterns illustrated in FIG. 8 or any other pattern. The same reference signs as in FIG. 3 are used as far as possible in relation to the luminance (Y) processing while reference signs relating to the chrominance (U and V) processing are again the same as far as possible, but primed.

In accordance with the pattern of FIG. 8(a), the U and V values for eight pixels, numbered 0–7 will be coded by block CCO' into a single 8-bit code word of a type referenced CWD', and transmitted (stored on disc) in an array CAR', which is consequently only one quarter the size of the luminance array LAR. The stored image thus occupies only 62 percent of the space occupied by the standard DYUV coded image. Before coding by the block CCO', the chrominance values are filtered horizontally to a resolution of 4 pixels (block CHFIL) and vertically to a resolution of 2 lines (block CVFIL). The blocks CHFIL and CVFIL may be implemented simultaneously if desired, for example by convolution of the array YUVAR with a suitable weighted window of, say, 4 pixels by 3 lines.

On the decoding side, in the display apparatus (below line 120'), one CWD' is read from the chrominance array CAR' and four LWD's are read from the luminance array LAR to generate (by OR-combination of data from the CLUT' and LLUT respectively) four DYUV code words 116', 118', 170 and 172 in the DYUV array DAR' in the pattern shown.

In the routine CWDEX' (Listing 3), three pointers into the array DAR' are used, since the word 132' read from the chrominance look-up table CLUT' is to be written to locations in three different series 174, 112' and 176 in the array DAR'. The CLUT' still comprises 256 32-bit entries (232') so that both of the DYUV code words 116' and 118' for series 112' can both be constructed using a single "OR.L" instruction (Line 3.5 Listing 3), while for the lines 174 and 176 (lines 3.6 and 3.8 of Listing 3, respectively), only the lower 16-bit word of the entry 232' is used.

| Listing 3 - CWDEX' | | |
|---|---|---|
| Line No. | Operation | Explanation |
| 3.1 | MOVEQ.L #0,D0 | ;Clear 32-bit register D0 ;(7 cycles) |
| 3.2 | MOVE.B (a1)+,D0 | ;A1 points to CWD' in CAR' ;Load CWD' into D0 and ;increment pointer (11 cycles) |
| 3.3 | LSL #2,D0 | ;Double left shift to create ;index into 32-bit wide CLUT' ;(19 cycles) |
| 3.4 | MOVE.L 0(A2,D0.W),D1 | ;A2 points to base of CLUT' ;Copy expanded words from CLUT' ;into register D1 (25 cycles) |
| 3.5 | OR.L D1,(A3)+ | ;A3 points to pair of DYUV words ;in DAR for pixel pairs (0,1) ;and (2,3). Writes UV nibbles ;into DYUV words by OR ;combination to preserve the dY ;nibbles already written ;(15 cycles) |
| 3.6 | OR.W D1.W, (A4)+ | ;A4 points to DYUV word (170) ;for pixel pair (4,5) in ;interpolated line above (174) ;(11 cycles) |
| 3.7 | ADDQ.L | ;Further increment to skip |

-continued

Listing 3 - CWDEX'

| Line No. | Operation | Explanation |
|---|---|---|
|  | #2,A4 | ;next word in line above ;(7 cycles) |
| 3.8 | OR.W D1,W, (A5)+ | ;A5 points to DYUV word (172) ;for pixel pair (6,7) in ;interpolated line below (176) ;(11 cycles) |
| 3.9 | ADDQ.L #2,A5 | ;Further increment to skip ;next word in line below ;(7 cycles) |

The time available if the microprocessor 18 is to expand the arrays LAR and CAR' as fast as they are received is the time taken to receive 5 bytes (4 LWD and 1 CWD') from disc: in excess 450 cycles. The routine LWDEX (Listing 1) takes 50 cycles as before, while the routine CWDEX' takes 113 cycles. The total for 5bytes is thus 4×50+113=313 cycles, which is well within the 450 cycles available. This method therefore allows 16% of screen area to be updated at the same rate as only 10% using standard DYUV and with no loss of luminance resolution. Using a further vertical expansion of both luminance and chrominance by the technique described in copending application No. 8830210.4 (PHB 33520) mentioned above, this area can readily be increased to 32% of the screen area.

To implement another example (not illustrated further) using the pattern of FIG. 8(b), the routine CWDEX' can be modified to write dU and dV nibbles into eight words of the DYUV array (DAR, DAR') in 143 cycles. Since the disc read time for 9 bytes (8 luminance and 1 chrominance) is about 810 cycles 8×50+143=543 cycles, such images can also be expanded in real time to fill 18% of the screen area at the above-mentioned rate, and still with no loss of luminance resolution.

Many other variations are available, involving different permutations of resolution, number of quantisation levels and so forth for the three pixel components. For example, if some loss of luminance resolution was tolerable, the pattern of FIG. 8(a) (H=2, V=2) could be used for the dY expansion, with that of FIG. 8(b) (H=4, V=4, allowing for the H=2inherent in DYUV chrominance coding) being used for the chrominance expansion.

It should be appreciated that compression of images as achieved by the techniques presented is advantageous for the transmission or storage of still pictures as well as motion video sequences. Compression allows more (or larger) images to be stored in a given storage capacity, for example the Compact Disc or the main memory of the CD-I player or other display apparatus. In the latter case, a particular advantage is that a relatively large number of images can be stored in compressed form in the memory, ready for almost instant expansion and display when the user of the apparatus selects a particular image for display. This avoids the irritation of the user that might result if the image, once selected had then to be located and read from the disc, or requested and received through some other data channel.

Since the signals Y, U and V will generally have been subject to the conventional non-linear process of "gamma correction", a small part of the luminance information for the image will in practice be carried by the U and V values instead of the Y value. Therefore, the low-pass filtering of the U and V values by the block CFIL will remove some of the high-frequency luminance component from the image. As shown dotted in FIGS. 3 and 9, the high frequency chrominance signals (HFC) discarded by the filter block CFIL can be processed by a compensation block GAM to retrieve the lost high frequency luminance signal (HFCOMP) and add it to the Y values at the input of the luminance coder LCO. A method for retrieving the lost HF luminance signal has been described, in connection with the (analogue) NTSC television system. in the book "Color Television Standards", edited by Donald G. Fink, published in 1955 by the McGraw Hill Book Company or New York. Such a method was not adopted in the NTSC broadest standard because of the need for compatibility of the NTSC system with existing monochrome receivers. In a system such as CD-I, where monochrome compatibility is not necessary, this compensation technique may be used to advantage. In particular, while the compensation requires relatively complex processing, this is all to be performed at the encoding stage, and no extra processing or hardware is required in the display apparatus.

From reading the present disclosure, other modifications will be apparent to persons skilled in the art. Such modifications may involve other features which are already known in the design, manufacture and use of image transmission and storage systems, display apparatuses and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A method of generating in a display apparatus a series of differential pulse code modulation (DPCM) code words of a standard format, each standard code word of the series comprising a plurality of delta codes including at least one standard luminance delta code and one standard chrominance delta code defining, by reference to a standard set or respective standard sets of differential values, respective luminance and chrominance values for one or more of a corresponding series of pixels forming one line of a colour image at a display luminance resolution and a display chrominance resolution respectively, the method comprising the steps of:
   (a) receiving from an image source at a source resolution luminance and chrominance values for a source series of pixels forming a line of a source image;
   (b) differentially encoding at a first resolution the luminance values of the source series of pixels using a first predetermined (luminance) set of quantisation levels to generate a first series of code words comprising delta codes representing only luminance values, the first resolution being equal, in a line scan ("horizontal") direction, to the display luminance resolution divided by a first integer factor $H_L$ (one or greater);

(c) differentially encoding at a second resolution at least one chrominance value for each pixel of the source series of pixels using a second (chrominance) predetermined set of quantisation levels to generate a second series of code words comprising delta codes representing only chrominance values the second resolution being equal, in the horizontal direction, to the display chrominance resolution divided by a second integer factor $H_C$, $H_C$ being greater than $H_L$; the method further comprising performing, within the display apparatus, the steps of:

(d) receiving via a data channel the first and second series of codes generated in the steps (b) and (c);

(e) generating from the first (luminance) series of code words received via the data channel, and from information stored in the display apparatus defining the first resolution in terms of the display luminance resolution and the first set of quantisation levels in terms of the or the respective standard set of differential values, a series of standard luminance delta codes defining luminance values for a series of pixels at the display luminance resolution;

(f) generating from the second (chrominance) series of code words received via the data channel, and from information stored in the display apparatus defining the second resolution in terms of the display chrominance resolution and the second set of quantisation levels in terms of the or the respective set or sets of differential values, a series of standard chrominance delta codes defining chrominance values for a series of pixels at the display chrominance resolution; and (g) combining the generated standard luminance delta codes with the generated standard chrominance delta codes to generate the said series of standard code words.

2. A method as claimed in claim 1, wherein for the performance of step (e) at least part of the said information is stored in the display apparatus in the form of a luminance look-up table, each code word of the first series defining the address of an entry in the look-up table, which entry contains a corresponding one or more standard luminance delta codes.

3. A method as claimed in claim 1, wherein for the performance of step (f) at least a part of the said information is stored in the form of a chrominance look-up table, each code word of the second series defining the address of an entry in the look-up table, which entry contains a corresponding one or more standard chrominance delta codes.

4. A method as claimed in claim 1, wherein the luminance delta code or codes generated in step (e) are in accordance with the standard code word format, with bit positions for the missing chrominance delta codes filled with masking bits and wherein the step (g) comprises forming a logical combination of the codes generated in steps (e) and (f) in such a manner that the masking bits become overwritten by the missing chrominance and/or luminance delta codes respectively.

5. A method as claimed in claim 1, wherein the chrominance delta codes generated in step (f) are in accordance with the standard code word format, with bit positions for the missing luminance delta codes filled with masking bits, and wherein the step (g) comprises forming a logical combination of the codes generated in steps (e) and (f) in such a manner that the masking bits become overwritten by the missing chrominance and/or luminance delta codes respectively.

6. A method as claimed in claim 1 wherein each of the second (chrominance) set of quantisation levels is a sum of $H_C$ standard differential values and each chrominance-only delta code in the second series of code words is expanded in the step (f) into a group of $H_C$ standard chrominance delta codes.

7. A method as claimed in claim 6 wherein each chrominance-only delta code of the second series of code words is expanded into a group of $H_C$ identical standard chrominance delta codes, the associated quantisation level being $H_C$ times the corresponding standard chrominance differential value.

8. A method as claimed in claim 7 wherein the second (chrominance) resolution in a field scan ("vertical") direction is an integer factor $V_C$ lower than the display chrominance resolution in the vertical direction, and wherein after the step (f) the method further comprises a step of:

(f2) combining the series of standard chrominance delta codes generated in step (f) to define chrominance values for one line of the image with a further series of standard chrominance delta codes similarly generated to define a further, neighbouring line of the image, to generate at least one intervening series of standard chrominance delta codes also divided into groups of $H_C$ delta code, each group of $H_C$ delta codes of the intervening line comprising a predetermined mixture of the $H_C$ delta codes in the corresponding groups of the said series and the said further series of standard chrominance delta codes, so as to define an intervening line of the image in which chrominance values are interpolated between corresponding chrominance values in the one line and the neighbouring line of the image.

9. A display apparatus comprising a decoder adapted for decoding a series of DPCM code words of a standard format, each standard code word of the series comprising a plurality of delta codes including at least one standard luminance delta code and one standard chrominance delta code, by generating therefrom, with reference to a standard set or respective standard sets of differential values, respective luminance and chrominance values for a corresponding series of pixels forming a line of a colour image to be displayed, at a display luminance resolution and a display chrominance resolution respectively; the display apparatus further comprising:

means for receiving from a data channel a first (luminance) series of codes and a second (chrominance) series of codes, and means for generating from the received series of codes a series of standard code words in accordance with steps (e), (f) and (g) of a method as claimed in claim 1.

10. A display apparatus as claimed in claim 9 wherein the generating means comprises a microprocessor under control of program data received via the data channel in advance of the said first and second series of codes.

11. A display apparatus as claimed in claim 10 wherein the receiving means comprises a device for reading the said series of codes from an optical memory disc under control of the microprocessor.

12. A method as claimed in claim 1 further comprising the step of:
   (d2) receiving via the said data channel, in advance of the first and second series of code words, configuring information including the information required to be stored in the display apparatus for the performance of step (e), and/or step (f).

13. A method as claimed in claim 12 wherein the said configuring information includes program data for a microprocessor in the display apparatus, which program data enables the steps (e), (f) and (g) to be performed automatically by the display apparatus upon receipt of the first and second series of code words from the data channel.

14. A method as defined in claim 12 wherein the step (d) comprises reading the said series of delta codes from a storage device at a limited data rate and the step (d2) comprises reading the configuring information from the storage device in advance of performing the step (d).

15. A method as claimed in claim 14 wherein the storage device is an optical memory disc recorded in accordance with the Compact Disc-Interactive standard.

16. A method of storing data representing one or more colour images, the method comprising: generating, in accordance with steps (a), (b) and (c) of a method as claimed in claim 14, a first and a second series of codes for each of a number of lines of each image; and storing the said series of codes in a storage device.

17. An optical memory disc whereon data representing a colour image have been stored by a method as claimed in claim 16.

18. A method as claimed in claim 16 comprising the further step of storing in the storage device configuring information for reading in accordance with step (d2) of the said method.

19. A method as claimed in claim 18 wherein the storage device is an optical memory disc recorded in accordance with the Compact Disc-Interactive standard.

20. An optical memory disc whereon data representing a colour image have been stored by a method as claimed in claim 19.

* * * * *